No. 868,355. PATENTED OCT. 15, 1907.
F. MUELLER.
BRICK MACHINE.
APPLICATION FILED JAN. 22, 1906.

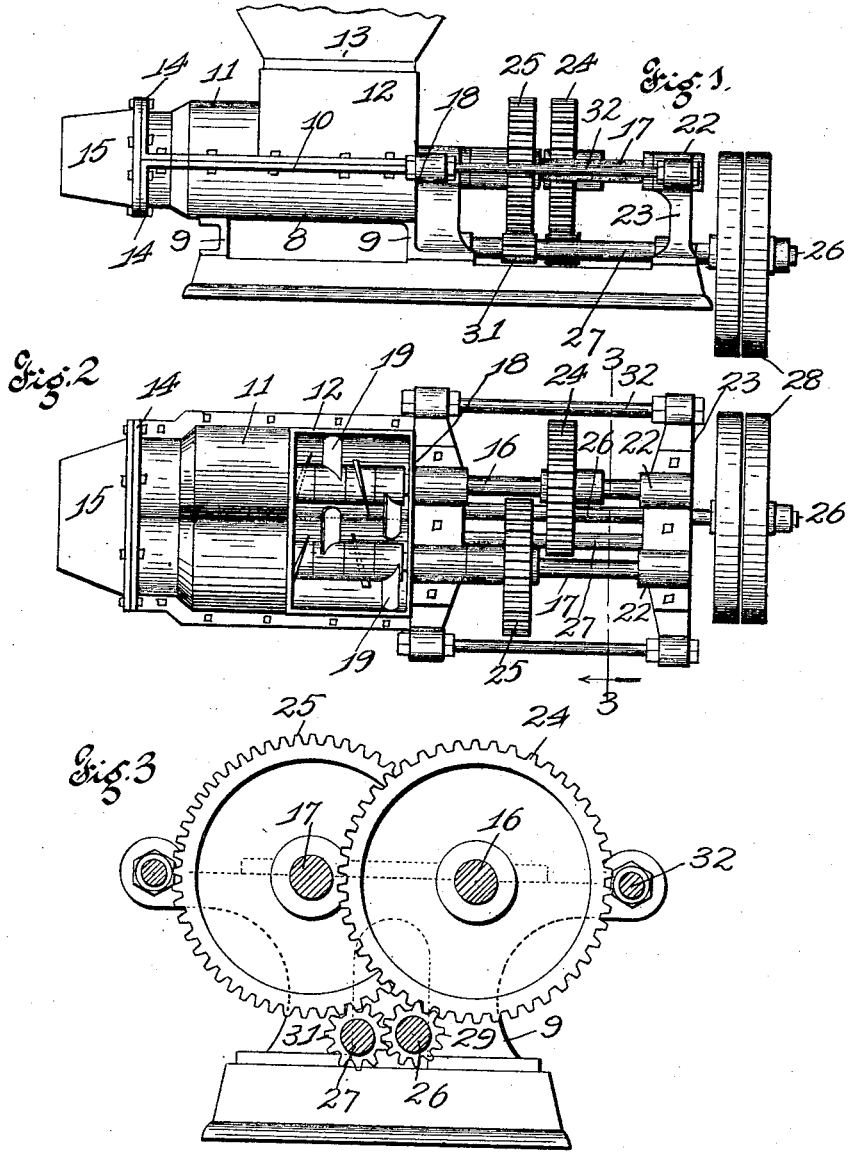

2 SHEETS—SHEET 2.

Witnesses
W. C. Stein
L. A. L. McIntyre

Inventor
Friedrich Mueller
by Hopkins & Eiks Attys.

UNITED STATES PATENT OFFICE.

FRIEDRICH MUELLER, OF ST. LOUIS, MISSOURI.

BRICK-MACHINE.

No. 868,355.  Specification of Letters Patent.  Patented Oct. 15, 1907.

Application filed January 22, 1906. Serial No. 297,330.

*To all whom it may concern:*

Be it known that I, FRIEDRICH MUELLER, a subject of the Emperor of Germany, and a resident of St. Louis, Missouri, have invented certain new and useful Improvements in Brick-Machines, of which the following is a specification.

My invention relates to improvements in brick machines, and consists of the novel features hereinafter described and claimed.

The object of my invention is to construct a machine wherein the clay is admitted in a plastic state, and by the revolving of a series of agitators and conveyers, the clay is discharged from the machine in a continuous cake, and thereafter cut into bricks.

Figure 4:
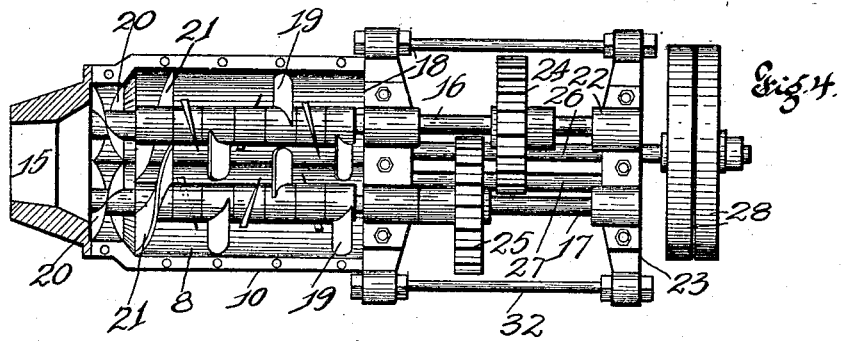
Figure 5:
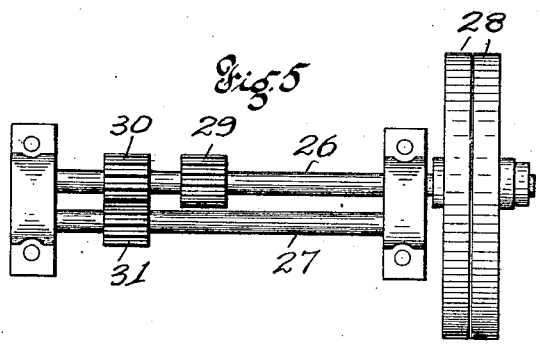
Figure 7:
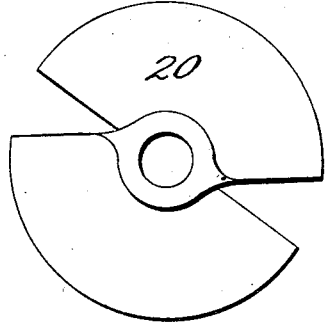
Figure 6:
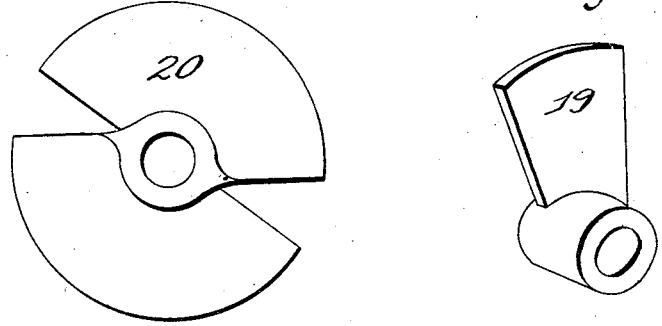

In the drawings—Figure 1 is a side elevation of my complete invention. Fig. 2 is a top plan view of the same. Fig. 3 is an enlarged vertical cross-sectional view taken on the line 3—3 of Fig. 2. Fig. 4 is a top plan view of my invention with the hopper and upper portion of the housing removed, and a part of the die in section showing the arrangement of the agitators and conveyers. Fig. 5 is a detail view of the driving-pinions made use of in connection with my invention. Fig. 6 is a detail perspective view of one of the agitators. Fig. 7 is a detail front view of one of the conveyers.

Referring to the drawings in detail, 8 indicates a casing mounted upon suitable supports 9. The casing 8 is provided with flanges 10, to which is securely bolted a housing 11, and a hopper-casing 12. Upon the hopper-casing is located a hopper 13, which may be of any desired shape and size to receive the clay. The outer end of the casing 8 and the housing 11 is provided with a flange 14 to which is securely bolted the die 15, through which the clay is passed and formed into the desired size required.

Within the casing 8 is located a pair of shafts 16 and 17, both of which extend through the wall 18 of the casing, and upon said shafts are mounted a plurality of agitators 19, arranged in position so as to continuously agitate the plastic clay, and at the same time convey the mass forward toward the die. The blade portion of the agitators is formed at an angle and during the operation of the shafts, which rotate toward each other, will permit the agitators to freely pass without hindrance to each other, yet contact with every particle of plastic clay. The forward end of each of the shafts 16 and 17 is provided with a conveyer 20. The forward edge of the conveyer coming in contact with the inner surface of the die, has a tendency to force the clay through the die 15 and discharge the plastic clay in a continuous mass. Upon the said shafts 16 and 17, and between the conveyers 20 and agitators 19, is a conveyer 21 constructed only of one wing each instead of a pair, of which the conveyers 20 are formed. The shafts 16 and 17 have bearing in the journal-boxes 22 formed on the supports 23, and said shafts are each provided with a gear-wheel 24 and 25. In the supports 9 and 23 are journaled a pair of shafts 26 and 27, the shaft 26 acting as a driving-shaft, and its projecting end is provided with the pulley-wheels 28. The shaft 26 is provided with a pair of pinions 29 and 30, the pinion 30 meshing with a pinion 31 located on the shaft 27; the pinion 29 meshing with the gear-wheel 24, while the pinion 31 meshes with the gear-wheel 25. By this arrangement, the shafts 16 and 17 are revolved in opposite directions, to operate the agitators and bring the same in contact with every particle of the clay as it is fed into the casing through the hopper 13. The supports 9 and 23 are rigidly retained in position and braced together by the rods 32.

Having fully described my invention, what I claim as new and desire to have secured to me by the grant of Letters Patent, is:

1. A brick machine comprising a casing, a pair of shafts revolubly mounted within said casing, a plurality of agitators mounted upon the shafts, a pair of conveyers located upon each of said shafts, the forward conveyer contacting with the end of the casing to convey the plastic clay through a die opening, a pair of gear wheels mounted upon said shafts, a drive shaft provided with gear pinions which mesh with and operate the gear wheels in opposite direction, and a hopper located upon the top of the casing for the admission of the plastic clay, substantially as specified.

2. A brick machine comprising a casing, a die at the forward end of the casing, a pair of shafts extending into the casing, a double conveyer located on the end of each shaft and contacting with the die to press the plastic clay into and through the die, a second single conveyer located upon each shaft at the rear of the forward conveyer to assist in the feeding of the plastic clay, and a plurality of agitators located upon the shaft to the rear of the last mentioned conveyer for agitating the clay, a gear wheel located upon each of said shafts, a drive shaft, a counter-shaft, a pair of gear pinions located upon the drive shaft, and a gear pinion located upon the counter-shaft, said gear pinions meshing with and operating the gear wheels to revolve the conveyers and agitators in opposite direction, substantially as specified.

In testimony whereof, I have signed my name to this specification, in presence of two subscribing witnesses.

FRIEDRICH MUELLER.

Witnesses:
ALFRED A. EICKS,
WALTER C. STEIN.